United States Patent
Takasawa et al.

(10) Patent No.: US 12,415,389 B2
(45) Date of Patent: Sep. 16, 2025

(54) TIRE PRESSURE MONITORING SYSTEM, TIRE PRESSURE MONITORING PROGRAM AND TIRE PRESSURE MONITORING METHOD

(71) Applicant: BRIDGESTONE CORPORATION, Tokyo (JP)

(72) Inventors: Yuya Takasawa, Tokyo (JP); Thierry Jakircevic, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 128 days.

(21) Appl. No.: 18/286,445

(22) PCT Filed: Feb. 7, 2022

(86) PCT No.: PCT/JP2022/004725
§ 371 (c)(1),
(2) Date: Oct. 11, 2023

(87) PCT Pub. No.: WO2022/219897
PCT Pub. Date: Oct. 20, 2022

(65) Prior Publication Data
US 2024/0190184 A1 Jun. 13, 2024

(30) Foreign Application Priority Data
Apr. 12, 2021 (JP) ................. 2021-067132

(51) Int. Cl.
*B60C 23/04* (2006.01)
*G07C 5/08* (2006.01)

(52) U.S. Cl.
CPC ........ *B60C 23/0401* (2013.01); *G07C 5/0816* (2013.01)

(58) Field of Classification Search
None
See application file for complete search history.

(56) References Cited

U.S. PATENT DOCUMENTS

| 5,710,539 A | 1/1998 | Iida |
| 2002/0126005 A1 | 9/2002 | Hardman et al. |

(Continued)

FOREIGN PATENT DOCUMENTS

| CN | 102862449 A | 1/2013 |
| CN | 103547464 A | 1/2014 |

(Continued)

OTHER PUBLICATIONS

Extended European Search Report dated Aug. 28, 2024 in Application No. 22787825.3.

(Continued)

*Primary Examiner* — Amelia Vorce
(74) *Attorney, Agent, or Firm* — Sughrue Mion, PLLC (57) ABSTRACT

The tire pressure monitoring system repeatedly acquires the internal pressure value of the pneumatic tire and activates the timer when the internal pressure value falls below the warning threshold. The tire pressure monitoring system stops the output of the warning information associated with the warning threshold even if the internal pressure value falls below the warning threshold again until the timer expires. The tire pressure monitoring system newly activates the timer when the internal pressure value exceeds the warning threshold after falling below the warning threshold or the danger threshold in the period until the timer expires.

6 Claims, 6 Drawing Sheets

(56) References Cited

U.S. PATENT DOCUMENTS

| | | |
|---|---|---|
| 2006/0016110 A1 | 1/2006 | Nakatani et al. |
| 2007/0144639 A1 | 6/2007 | Oh |
| 2010/0182142 A1 | 7/2010 | Svedberg et al. |
| 2011/0190975 A1 | 8/2011 | Hourlier et al. |
| 2013/0009763 A1 | 1/2013 | Koga |
| 2014/0172342 A1* | 6/2014 | Yu ............ B60C 23/0471 702/104 |
| 2017/0129294 A1 | 5/2017 | Taki |
| 2017/0305213 A1 | 10/2017 | Taki |
| 2020/0031180 A1 | 1/2020 | Usami |

FOREIGN PATENT DOCUMENTS

| | | | |
|---|---|---|---|
| CN | 110366498 | A | 10/2019 |
| DE | 102015115917 | A1 * | 3/2017 ......... B60C 23/0454 |
| EP | 2 263 889 | B1 | 9/2014 |
| JP | 07-186643 | A | 7/1995 |
| JP | 2005-88613 | A | 4/2005 |
| JP | 2005-321315 | A | 11/2005 |
| JP | 2008-155795 | A | 7/2008 |
| JP | 2011-526560 | A | 10/2011 |
| JP | 2017-087957 | A | 5/2017 |
| JP | 2017-171240 | A | 9/2017 |
| JP | 2017-194412 | A | 10/2017 |
| JP | 6407807 | B2 | 10/2018 |

OTHER PUBLICATIONS

International Search Report for PCT/JP2022/004725 dated Apr. 5, 2022 (PCT/ISA/210).
Office Action issued Jul. 9, 2025 in Chinese Patent Application No. 202280027576.X.

* cited by examiner

TIRE PRESSURE MONITORING SYSTEM, TIRE PRESSURE MONITORING PROGRAM AND TIRE PRESSURE MONITORING METHOD

CROSS REFERENCE TO RELATED APPLICATIONS

This application is a National Stage of International Application No. PCT/JP2022/004725 filed Feb. 7, 2022, claiming priority based on Japanese Patent Application No. 2021-067132 filed Apr. 12, 2021.

TECHNICAL FIELD

The present disclosure relates to a tire pressure monitoring system, a tire pressure monitoring program and a tire pressure monitoring method for monitoring the tire pressure mounted on a vehicle.

BACKGROUND ART

Conventionally, a tire pressure monitoring system for monitoring the air pressure (internal pressure) of a pneumatic tire (hereinafter abbreviated as tire when appropriate) mounted on a vehicle has been widely used.

The internal pressure value of the pneumatic tire measured by the sensor can vary depending on the temperature of the air chamber in the pneumatic tire mounted on the rim wheel and measurement error of the sensor. Therefore, a technique for controlling the occurrence timing of an alarm of an internal pressure drop using a counter for the measurement times is known (Patent Literature 1).

CITATION LIST

Patent Literature

[Patent Literature 1]
Japanese Patent Laid-Open Publication No. H7-186643

SUMMARY OF INVENTION

However, when the internal pressure value fluctuates around the threshold value, which is the criterion of the alarm, the occurrence and stop of the alarm frequently occur, which places a large load on the tire pressure monitoring system, and there is also a concern that the user may feel annoyed.

Therefore, the following disclosure has been made in view of this situation, and the purpose of the disclosure is to provide a tire pressure monitoring system, a tire pressure monitoring method, and a tire pressure monitoring program which can output the alarm of the internal pressure drop at an appropriate timing while preventing the occurrence and stop of the alarm frequently.

One aspect of the present disclosure is a tire air pressure monitoring system (tire pressure monitoring system 10) including an acquisition unit (tire data acquisition unit 110) that repeatedly acquires an internal pressure value of a pneumatic tire (tire 30), a timer control unit (timer control unit 130) that activates a timer when the internal pressure value becomes equal to or less than a warning threshold, and an alarm unit (alarm unit 150) that outputs warning information until the timer expires when the internal pressure value becomes equal to or less than the warning threshold, and that outputs danger information until the timer expires when the internal pressure value becomes a danger threshold that is lower than the warning threshold. The timer control unit newly activates the timer when the internal pressure value exceeds the warning threshold value or the danger threshold value after falling below the warning threshold value or the danger threshold value in a period until the timer expires.

One aspect of the present disclosure is a tire pressure monitoring program causing a computer to execute an acquisition process for acquiring an internal pressure value of a pneumatic tire, a timer control process for activating a timer when the internal pressure value becomes equal to or less than a warning threshold, and an alarming process for outputting warning information until the timer expires when the internal pressure value falls below the warning threshold value, and outputting danger information until the timer expires when the internal pressure value becomes equal to or less than the warning threshold, and that outputs danger information until the timer expires when the internal pressure value becomes a danger threshold that lower than the warning threshold. In the timer control process, newly activates the timer when the internal pressure value exceeds the warning threshold value or the danger threshold value after falling below the warning threshold value or the danger threshold value in a period until the timer expires.

One aspect of the present disclosure is a tire pressure monitoring method including the steps of an acquisition step for repeatedly acquiring the internal pressure value of a pneumatic tire, a activating step for activating a timer when the internal pressure value becomes equal to or less than a warning threshold, and an outputting step for outputting warning information until the timer expires when the internal pressure value becomes equal to or less than the warning threshold, and that outputs danger information until the timer expires when the internal pressure value becomes a danger threshold that is lower than the warning threshold. In the activating step, newly activates the timer when the internal pressure value exceeds the warning threshold value or the danger threshold value after falling below the warning threshold value or the danger threshold value in a period until the timer expires.

MODES FOR CARRYING OUT THE INVENTION

Hereinafter, the embodiment will be described based on the drawings. The same functions and structures are denoted by the same or similar reference numerals, and the description thereof will be omitted accordingly.

(1) Overall Outline of Tire Pressure Monitoring System

Figure 1:
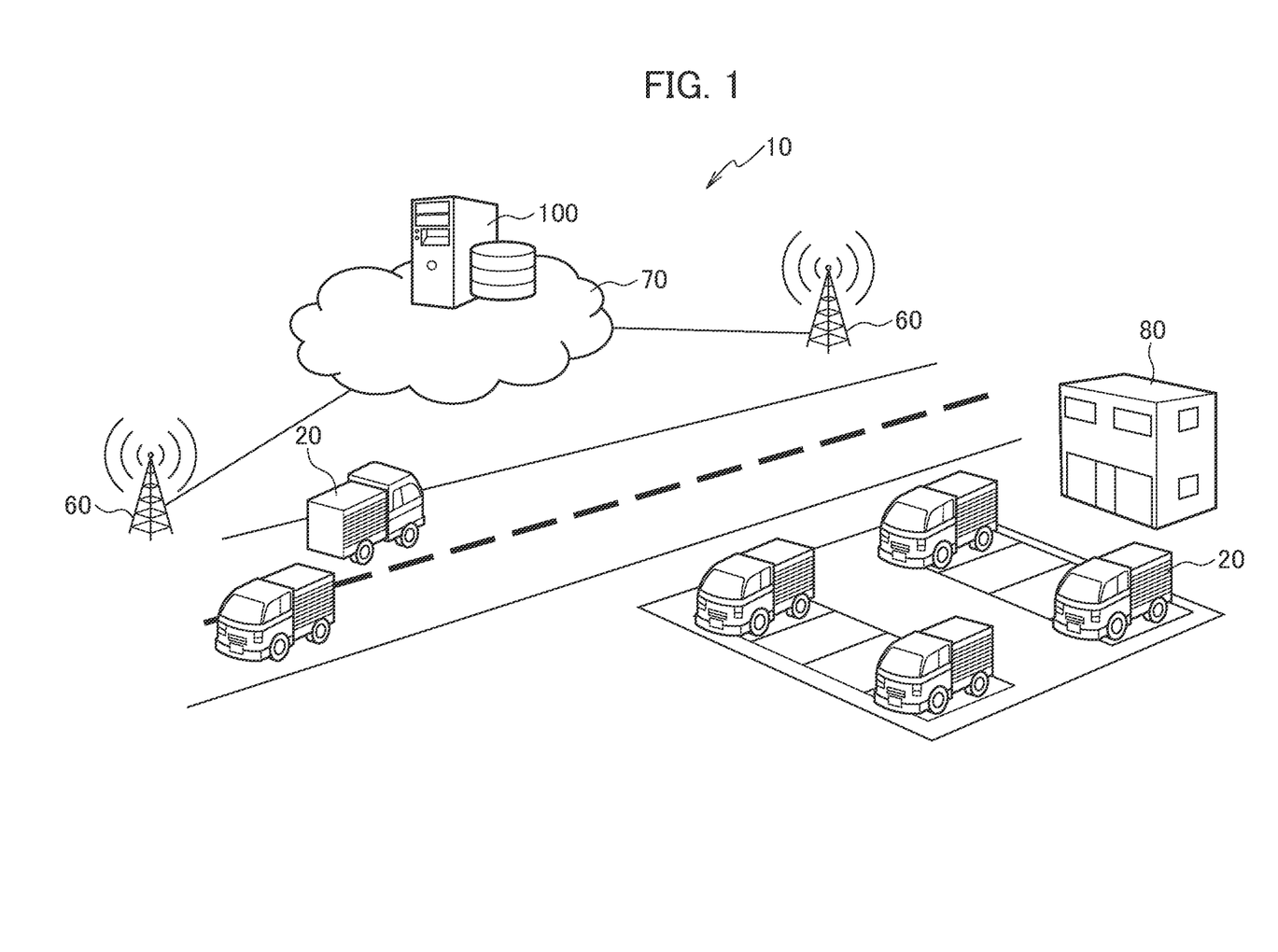
FIG. 1 is a schematic diagram of the tire pressure monitoring system 10.

FIG. 1 is an overall outline of the tire pressure monitoring system 10 according to the present embodiment. As shown in FIG. 1, the tire pressure monitoring system 10 provides monitoring services for a fleet including a plurality of vehicles 20, such as trucks. The tire pressure monitoring system 10 essentially monitors the status of individual vehicles 20 at a fixed point, such as within a base (yard) of a user 80 where the plurality of vehicles 20 are parked.

Figure 2:
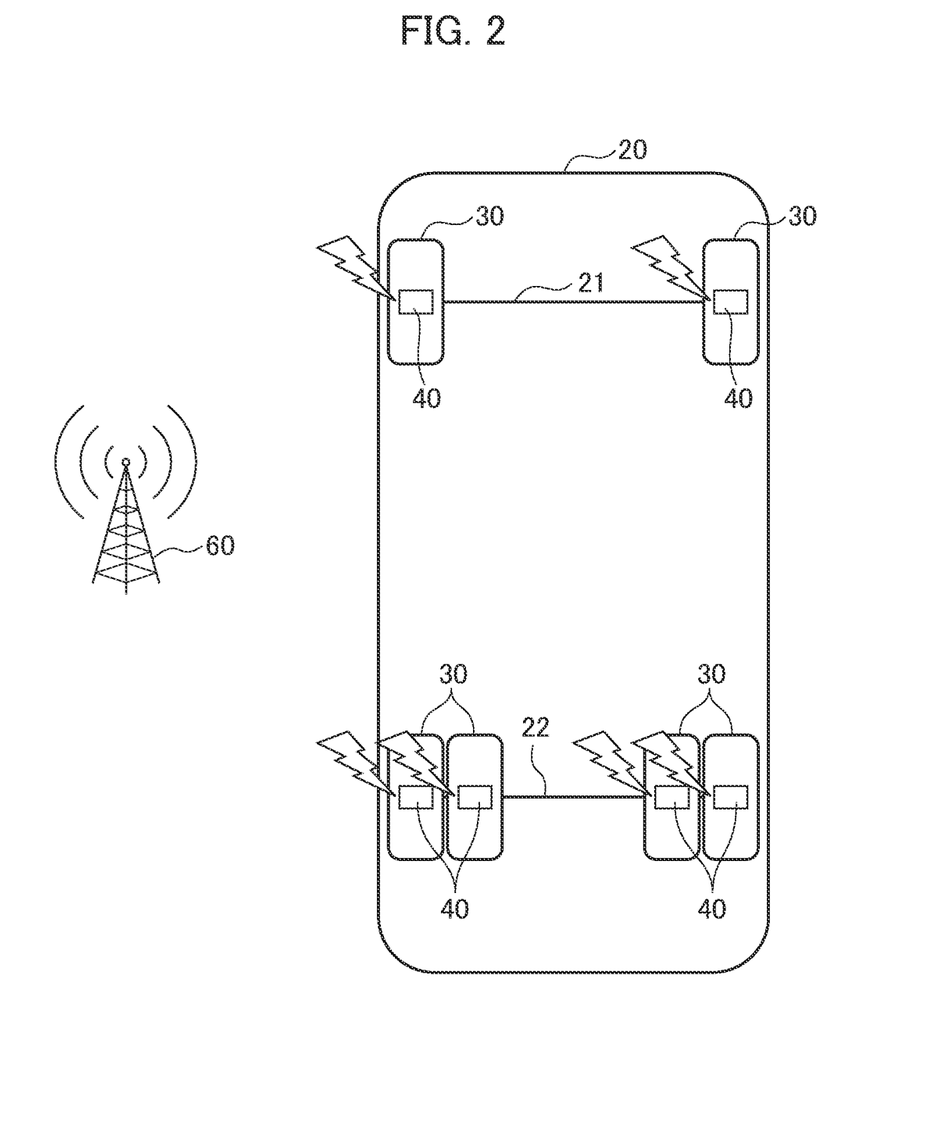
FIG. 2 is a schematic plan view of the vehicle 20.

In this embodiment, the tire pressure monitoring system 10 monitors the status of the vehicles 20, specifically, the pneumatic tires mounted on the vehicles 20, specifically, the status of tires 30 (Not shown in FIG. 1, see FIG. 2).

The tire pressure monitoring system 10 includes a tire condition monitoring server 100 that monitors the status of the plurality of tires 30 mounted on the vehicle 20 at a location separated from the vehicles 20, for example, in the yard of the user 80, using a plurality of sensors associated with each of the plurality of tires 30.

In this embodiment, the vehicle 20 is a vehicle used for business in a company, such as a truck. Therefore, the vehicle 20 may be other than a truck, for example, a bus or a taxi. The plurality of vehicles 20 are operated by the user 80 such as a company. However, the user 80 does not necessarily have to be a company (business entity) and may be a non-profit-making organization or individual.

The tire condition monitoring server 100 is connected to a communication network 70. The communication network 70 is a communication network using a wired or wireless communication system and may include the Internet.

The communication network 70 also includes a wireless access network called a so-called low-power wide area network (LPWA: Low Power Wide Area or LPWAN: Low Power Wide Area Network, hereinafter abbreviated as LPWA when appropriate).

LPWA is a wireless access system having coverage that cannot be satisfied by short-range wireless systems such as Bluetooth (registered trademark), and is characterized by low power consumption, low bit rate, and wide coverage.

Examples of services using LPWA include Sigfox (registered trademark), LoRa (registered trademark) and Wi-Fi HaLow. In this embodiment, the tire pressure monitoring system 10 assumes the use of services using LPWA. However, LPWA may be called by a different name, provided that it is a wireless communication system that has a wider coverage than a near-field communication system such as Bluetooth® and achieves lower power consumption than a mobile communication system such as 4G/LTE (Long Term Evolution).

A base station 60 is a wireless base station in accordance with LPWA and is a component of a low-power wide area network included in the communication network 70. A plurality of base stations 60 are arranged in a geographically distributed manner in order to secure a communication range by the low-power wide-area network.

(2) Vehicle Configuration

FIG. 2 is a schematic plan view of the vehicle 20. As described above, in this embodiment, the vehicle 20 is assumed to be a truck.

As shown in FIG. 2, the vehicle 20 has a front wheel axle 21 and a rear wheel axle 22. The front wheel axle 21 is a steering shaft and is located on the front side of the vehicle 20. The rear wheel axle 22 is a driving shaft and is located on the rear side of the vehicle 20, that is, on the loading compartment (loading platform) side. The rear wheel axle 22 is a so-called double tire, and two tires 30 are mounted on each side.

A total of 6 tires 30 are mounted on the vehicle 20 having such an axle configuration. Each tire 30 is mounted with a sensor unit 40. Specifically, the sensor unit 40 is mounted on the inner surface of a rim wheel (not shown) to which the tire 30 is assembled. The mounting position of the sensor unit 40 may not necessarily be the inner surface (well portion) of the rim wheel, may be the inner surface of the tire 30, or may be the base side of the air valve of the rim wheel.

The sensor unit 40 senses the state of the tire 30. Specifically, the sensor unit 40 measures the air pressure (internal pressure) and temperature of the tire 30 assembled to the rim wheel. In addition to the internal pressure and temperature, the sensor unit 40 may measure, for example, distortion.

The sensor unit 40 has a wireless communication function, specifically, a wireless communication function in accordance with LPWA, and can perform wireless communication with the base station 60.

(3) Functional Block Configuration of the Sensor Unit and Tire Pressure Monitoring System Next, the functional block configuration of the sensor unit 40 and the tire condition monitoring server 100 will be described.

(3.1) Sensor Unit 40

Figure 3:
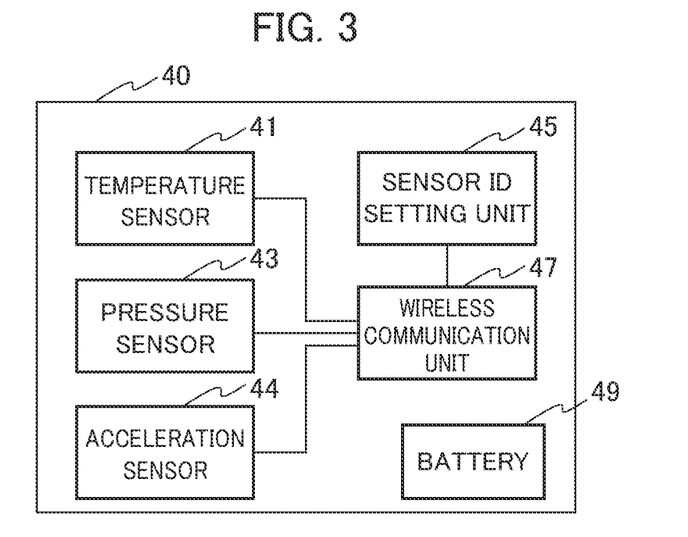
FIG. 3 is a functional block diagram of the sensor unit 40.

FIG. 3 is a functional block diagram of the sensor unit 40. As shown in FIG. 3, the sensor unit 40 includes a temperature sensor 41, a pressure sensor 43, an acceleration sensor 44, a sensor ID setting unit 45, a wireless communication unit 47, and a battery 49.

The temperature sensor 41 measures the temperature in the air chamber of the tire 30 attached to the rim wheel. For example, a semiconductor type can be used as the temperature sensor 41.

The pressure sensor 43 measures the pressure (internal pressure) in the air chamber of the tire 30. As the pressure sensor 43, for example, a capacitance type can be used.

The acceleration sensor 44 detects the acceleration of the tire 30 in a predetermined direction. In this embodiment, the acceleration sensor 44 can detect the acceleration of the tire 30 in tire radial direction, specifically, the centrifugal acceleration (which may be rephrased as centrifugal force). In addition to tire radial direction, the acceleration sensor 44 may also detect the acceleration in the tire width direction. As the acceleration sensor 44, a general-purpose acceleration sensor such as a 3-axis acceleration sensor may be used.

The sensor ID setting unit 45 sets a sensor ID (sensor identification information) for identifying the sensor unit 40. Specifically, the sensor ID setting unit 45 stores the identification information of the sensor unit 40 and provides the stored identification information to the wireless communication unit 47. Further, more information (e.g., tire type) may be included. The sensor identification information is multiplexed on a radio signal transmitted from the radio communication unit 47.

The radio communication unit 47 has a radio communication function in accordance with LPWA. Specifically, the radio communication unit 47 transmits to the base station 60 a radio signal (radio wave) in which data indicating the measured temperature output from the temperature sensor 41 and data indicating the measured pressure (internal pressure) output from the pressure sensor 43 are multiplexed.

The temperature sensor 41 and the pressure sensor 43 may not measure the temperature and internal pressure during the period when the sensor unit 40 detects acceleration, that is, during the period when the tire 30 is rolling.

The battery 49 supplies the necessary power to each functional block constituting the sensor unit 40. Specifically, although the type of the battery is not particularly limited, it is preferable that the battery 49 be composed of a primary battery or the like capable of continuously driving the sensor unit 40 over a long period of time (For example, one year or more).

(3.2) Tire Condition Monitoring Server 100

Figure 4:
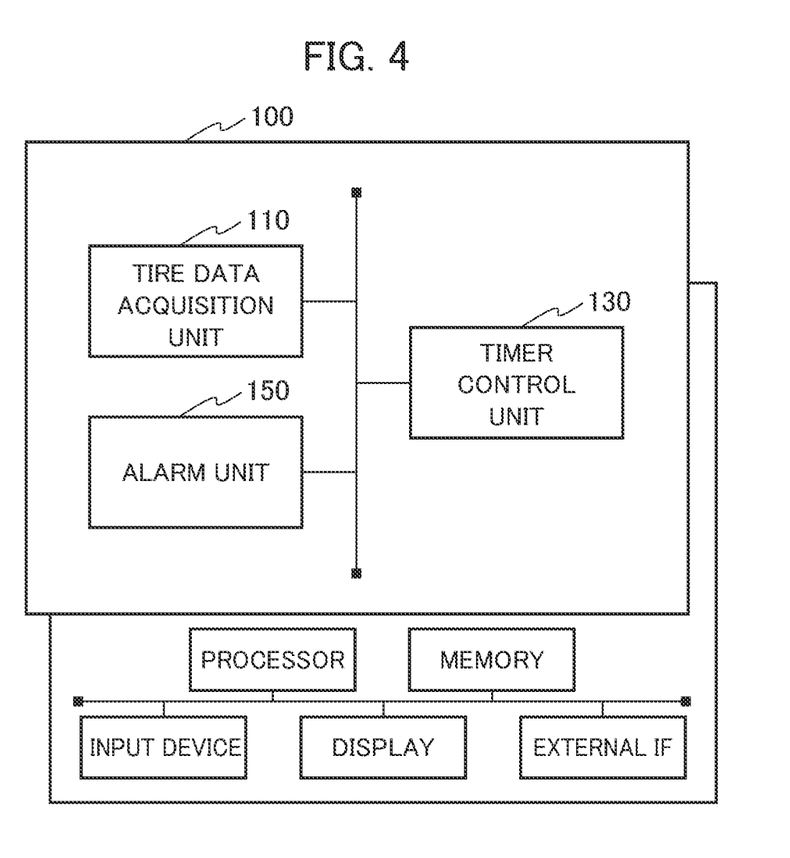
FIG. 4 is a functional block diagram of the tire condition monitoring server 100.

FIG. 4 is a functional block configuration diagram of the tire condition monitoring server 100. As shown in FIG. 4, the tire condition monitoring server 100 includes a tire data acquisition unit 110, a timer control unit 130, and an alarm unit 150.

These function blocks are realized by executing a computer program (software) on hardware such as a server computer.

Specifically, the tire condition monitoring server 100 includes, as hardware elements, a processor, a memory, an input device, a display, and an external interface. The computer program (software) may also be provided via the communication network 70 or recorded on a computer-readable recording medium such as an optical disk, a hard disk drive, or a flash memory.

The tire data acquisition unit 110 acquires tire data indicating the state of the tire 30 from the sensor unit 40 (see FIGS. 2 and 3). Specifically, the tire data acquisition unit 110 directly acquires tire data via wireless communication from a plurality of sensors such as the temperature sensor 41 and the pressure sensor 43 that are associated with the plurality of tires 30, that is, constitute the sensor unit 40 attached to the tires 30 (Specifically, rim wheels, hereinafter the same).

The tire data include at least internal pressure data measured by the pressure sensor 43. The internal pressure data may be data from which the internal pressure value of the tire 30 can be determined. The internal pressure value may be indicated directly, or it may be an index with a smaller number of bits than that indicated directly.

The tire data may also include temperature data measured by the temperature sensor 41. In addition, if the sensor unit 40 includes other sensors (For example, an acceleration sensor), the tire data may include data measured by the sensors.

The tire data acquisition unit 110 repeatedly acquires tire data from the sensor unit 40 through the base station 60 and the communication network 70. In this embodiment, the tire data acquisition unit 110 constitutes an acquisition unit for repeatedly acquiring the internal pressure value of the pneumatic tire.

In this embodiment, the tire data acquisition unit 110 acquires tire data via wireless communication via a low-power wide-area network (LPWA). That is, the tire data acquisition unit 110 directly acquires tire data via wireless communication using LPWA from the sensor unit 40, rather than via the vehicle 20 using a short-range wireless method from the sensor unit 40.

The tire data acquisition timing (repetition period) is not particularly limited, but is generally set to about 1 to 10 minutes, for example. In consideration of the characteristics of LPWA, the acquisition timing (repetition period) may be longer.

The timer control unit 130 controls a timer used for determining the timing for outputting information indicating abnormality of tire data. Specifically, the timer control unit 130 can control a timer used for determining the timing for outputting warning information and danger information.

Cautionary information may be referred to as Warning. Warning may be interpreted as information alerting the user 80 (and/or driver of vehicle 20, hereinafter the same) to a decrease in internal pressure. Warning may be positioned as an alert alerting the user 80 to a decrease in internal pressure but requiring no immediate action.

The danger information may be referred to as Critical. Critical may be interpreted as information that requests the user 80 to respond immediately, for example, to stop the vehicle 20 from running and check the tire condition.

The warning information may be associated with a threshold of the internal pressure value (called the warning threshold), and the danger information may be associated with a threshold of the internal pressure value lower than the warning threshold (called the danger threshold).

For example, the warning threshold may be a 5~10% reduction in the recommended internal pressure value, and the danger threshold may be a 20% reduction in the recommended internal pressure value. The recommended internal pressure value may be the internal pressure value specified by the manufacturer of the vehicle 20, or the air pressure corresponding to the maximum load capacity in the JATMA (Japan Automobile Tire Manufacturers Association) Year-Book (may be referred to as normal internal pressure). It should be noted that ETRTO in Europe, TRA in the United States, and other national tire standards are applicable.

When the internal pressure value becomes equal to or less than the warning threshold, the timer control unit 130 starts the timer. Specifically, when the internal pressure value based on the tire data acquired by the tire data acquisition unit 110 becomes equal to or less than the warning threshold, the timer control unit 130 may activate (start) the timer.

On the other hand, when the internal pressure value acquired by the tire data acquisition unit 110 becomes equal to or less than the warning threshold or the danger threshold, and then exceeds the warning threshold, the timer control unit 130 may activate a new timer. Even if the internal pressure value becomes equal to or less than the warning threshold or the danger threshold before the expiration of the newly started timer, the timer control unit 130 need not restart the timer.

Further, the timer control unit 130 may continue the timer without restarting the timer when the internal pressure value becomes higher than the critical threshold value and becomes lower than the warning threshold value after the internal pressure value becomes lower than the critical threshold value. That is, the timer control unit 130 may continue the timer without stopping and restarting (resetting) the timer when the internal pressure value below the critical threshold value exceeds the critical threshold value but is lower than the warning threshold value.

The alarm unit 150 executes processing related to the alarm of the internal pressure value based on the warning threshold value or the warning threshold value. Specifically, the alarm unit 150 can output warning information (Warning) associated with the warning threshold value or danger information (Critical) associated with the warning threshold value.

The alarm unit 150 can notify the warning information or danger information to a predetermined destination associated with the user 80. The predetermined destination may be an e-mail address of the driver of the user 80 or the vehicle 20, or it may be an ECU (Electronic Control Unit) installed in the vehicle 20.

The alarm unit 150 outputs warning information when the internal pressure value acquired by the tire data acquisition unit 110 is equal to or less than the warning threshold. The alarm unit 150 outputs danger information when the internal pressure value is equal to or less than the danger threshold.

Specifically, when the internal pressure value becomes equal to or less than the warning threshold, the alarm unit 150 may output warning information until the timer activated by the timer control unit 130 expires. When the internal pressure value becomes the danger threshold, the alarm unit 150 may output danger information until the timer expires. That is, the alarm unit 150 may continue to output warning information or danger information until the timer expires.

In addition, the alarm unit 150 may not output warning information when the internal pressure value acquired by the tire data acquisition unit 110 becomes higher than the danger threshold and less than the warning threshold after it becomes less than the danger threshold. In this case, as described above, the timer activated (restarted) by falling below the danger threshold may be continued without being reset.

(4) Operation of the Tire Pressure Monitoring System

Next, the operation of the tire pressure monitoring system 10 will be described. Specifically, the operation related to the output of warning information and danger information (critical) of the internal pressure value by the tire condition monitoring server 100 will be described.

(4.1) Schematic Operation Flow

Figure 5:
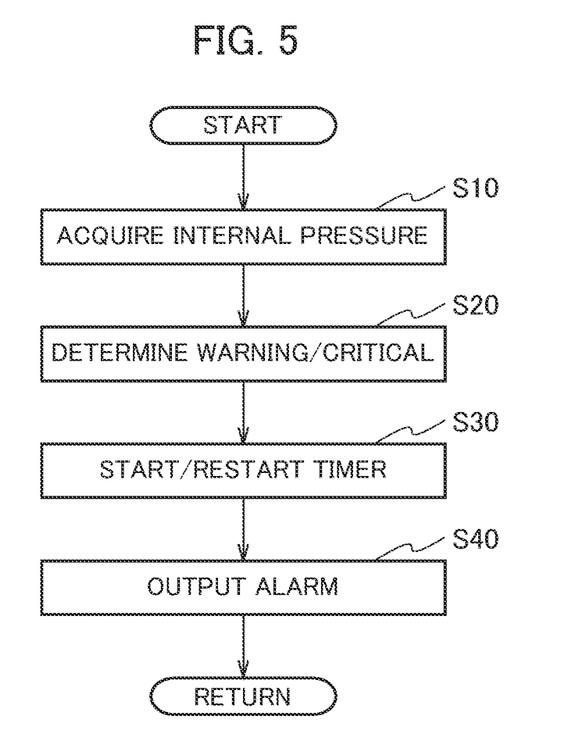
FIG. 5 is a diagram showing a schematic operation flow of an alarm output of an internal pressure value by the tire condition monitoring server 100.

FIG. 5 shows a schematic operation flow of an alarm output of an internal pressure value by the tire condition monitoring server 100. As shown in FIG. 5, the tire condition monitoring server 100 acquires an internal pressure value of the tire 30 (S10).

Specifically, the tire condition monitoring server 100 receives the internal pressure value based on the tire data transmitted from the sensor unit 40.

The tire condition monitoring server 100 executes a Warning/Critical determination based on the acquired internal pressure value (S20). Specifically, the tire condition monitoring server 100 determines whether the acquired internal pressure value is lower than the warning threshold or the danger threshold. As described above, the warning threshold can be a 5~10% reduction value of the recommended internal pressure value, and the danger threshold can be a 20% reduction value of the recommended internal pressure value. In the following example, the warning threshold value is a 10% reduction value of the recommended internal pressure value, and the danger threshold value is a 20% reduction value of the recommended internal pressure value.

The tire condition monitoring server 100 starts or restarts the timer based on the Warning/Critical determination result of the internal pressure value (S30). For example, the tire condition monitoring server 100 activates (starts) the timer when the internal pressure value becomes equal to or less than the warning threshold. The tire condition monitoring server 100 may restart the timer when the internal pressure value becomes equal to or less than the danger threshold value which is lower than the warning threshold value in the period until the activated timer expires.

Further, the tire condition monitoring server 100 may activate the new timer when the internal pressure value becomes equal to or less than the warning threshold value or danger threshold value and then exceeds the warning threshold value, that is, when the internal pressure value returns normally.

The restart of the timer may mean that the timer started when the internal pressure value falls below the warning threshold is restarted when the internal pressure value falls below the danger threshold. In a broad sense, when the internal pressure value is lower than the warning threshold, the timer is restarted when the severity changes, specifically, when the severity changes from below the warning threshold to below the danger threshold, or when the severity changes from below the danger threshold to above the danger threshold to below the warning threshold.

On the other hand, activating the new timer may mean starting the timer once the internal pressure value that is below the warning threshold or danger threshold exceeds the warning threshold.

The tire condition monitoring server 100 outputs an alarm according to the internal pressure value (S40). Specifically, the tire condition monitoring server 100 outputs warning information or danger information according to the internal pressure value.

The time from the start to the expiration of the timer may be set appropriately according to the type of the vehicle 20 and/or the tire 30, the operating environment, etc.

(4.2) Example

A specific operation example of the alarm output of the internal pressure value by the tire condition monitoring server 100 will be described below.

Figure 6:
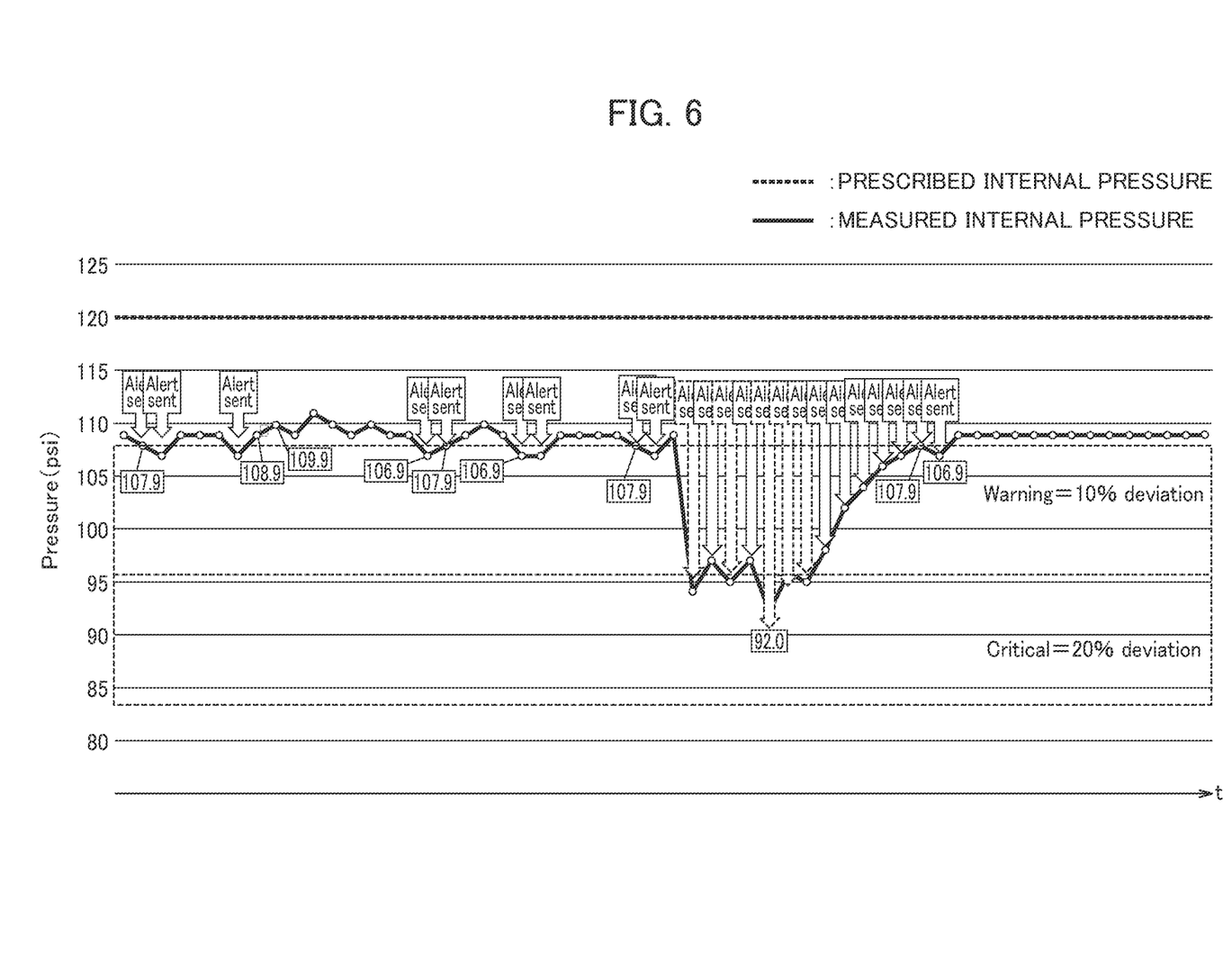
FIG. 6 is a diagram showing an operation example of an alarm output of a conventional internal pressure value.

FIG. 6 shows an operation example of the alarm output of the conventional internal pressure value. In this operation example, the recommended internal pressure value (prescribed internal pressure) is 120 psi (pound per square inch). In this operation example, the warning threshold value (Warning) is set to a 10% reduction value (108 psi) of the recommended internal pressure value, and the danger threshold value (Critical) is set to a 20% reduction value (96 psi) of the recommended internal pressure value. In addition, the internal pressure value may be acquired repeatedly in a 5-minute cycle, for example.

Note that bar or kPa may be used as the unit, rather than psi. A catastrophic threshold associated with an internal pressure value lower than the danger threshold may also be obtained. These internal pressure values may be set by the user 80 as appropriate.

As shown in FIG. 6, when it is determined whether the acquired internal pressure value has fallen below the warning threshold or the danger threshold without applying a timer and the warning information or the danger information is output, the occurrence and stop of the warning information or the danger information may be repeated frequently.

Such an event is caused mainly because the internal pressure value fluctuates up and down around the threshold due to at least one of the accuracy (measurement error) of the sensor unit 40 (pressure sensor 43) and the fluctuation of the temperature of the air chamber in the tire 30.

In the operation of outputting the warning information or the danger information (alarm) in accordance with the acquired internal pressure value as it is, the occurrence and stopping of the warning information or the danger information are likely to cause a problem.

Specifically, the occurrence and stopping of the alarm occur frequently, and a large load is applied to the tire condition monitoring server 100. If the occurrence and stopping of the alarm occur frequently, the user 80 may feel annoyed. It should be noted that even when the counter disclosed in Patent Literature 1 is used, it is considered that it is not sufficient to solve the above-mentioned problem when the occurrence and stopping of the alarm occur frequently.

Figure 7:
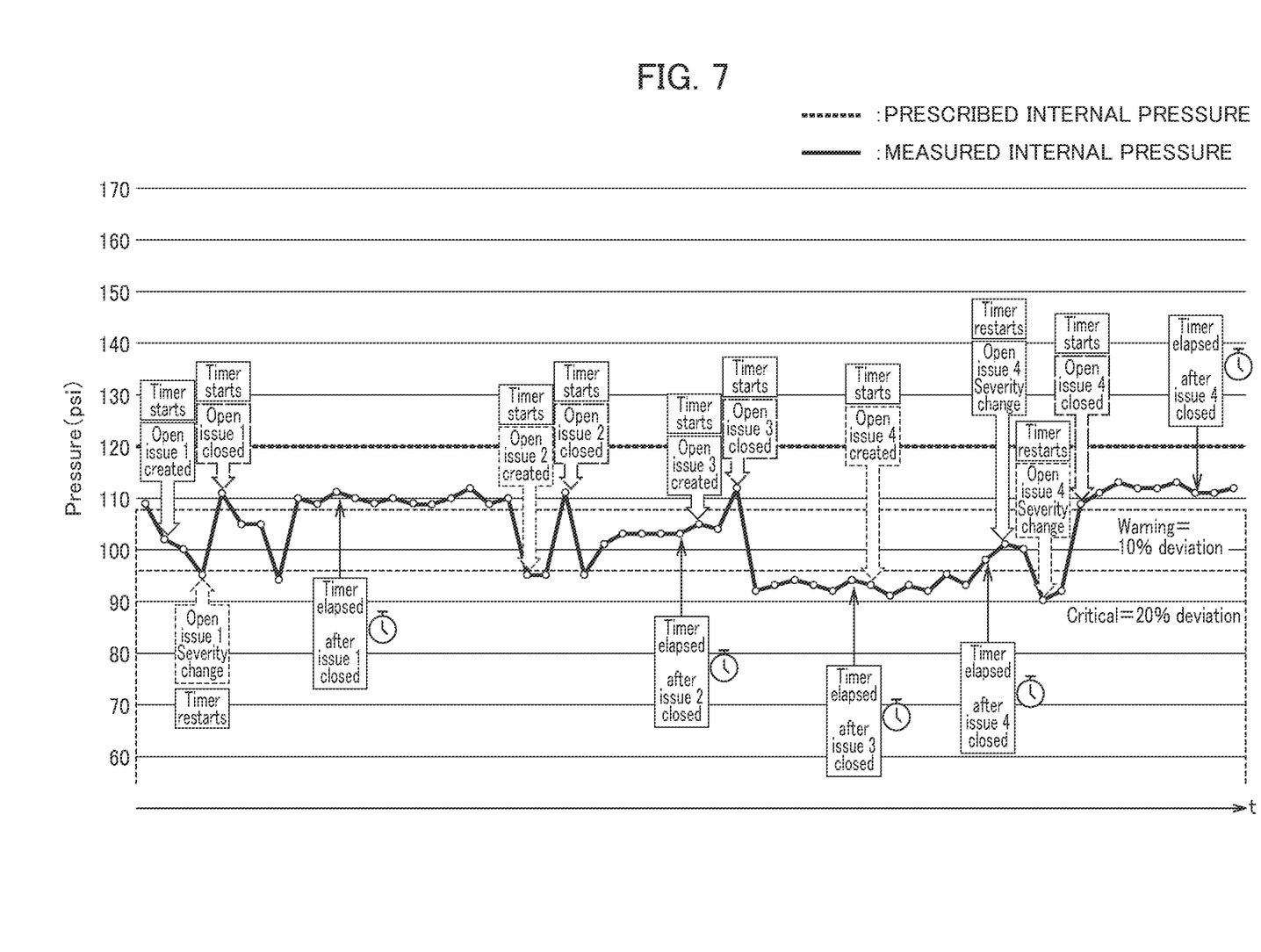
FIG. 7 is a diagram showing an operation example of an alarm output of an internal pressure value according to the present embodiment.

FIG. 7 shows an operation example of the alarm output of the internal pressure value according to the present embodiment. In order to more reliably solve the problem described above, a time limit on the output of warning information and danger information (alarm) concerning the internal pressure value is applied.

Specifically, even if an event corresponding to warning information or danger information, that is, the internal pressure value becomes less than or equal to the warning threshold or the internal pressure value becomes less than or equal to the danger threshold, the event may be ignored within a predetermined time period, that is, until the timer setting time has elapsed.

As described above, the timer may be started (or restarted) whenever an event corresponding to warning information or danger information (which may be called an open issue) occurs (create). If the event changes from Warning to Critical, that is, the severity of the event increases, the timer may be restarted.

Note that the issue may refer to an event (an identification symbol for internal processing) from the occurrence of the above-mentioned failure event related to one air pressure until its resolution.

The setting time of the restarted timer may be different from that of the timer started at the timing below the warning threshold (For example, a shorter time). The setting time of the timer started at the time below the danger threshold may be different from that of the timer started at the time below the warning threshold.

On the other hand, when the internal pressure value returns from the danger information to the level of the warning information, that is, when the internal pressure value below the danger threshold is above the danger threshold but below the warning threshold, the tire condition monitoring server 100 may ignore the change of such event and continue without stopping or restarting (resetting) the timer.

When the internal pressure value becomes below the warning threshold or the danger threshold and then exceeds the warning threshold (That is, if the pressure drop problem is resolved,), the timer may be started anew. In this case, the setting time of the timer may be the same as the timer started when the internal pressure value becomes below the warning threshold in the past, but it may be changed.

For this reason, events corresponding to warning or danger information that occurred from the time the problem of the internal pressure drop was resolved until the timer expired may be ignored (including a change from Warning to Critical).

Thus, the tire condition monitoring server 100 may activate (start) a timer (which may be called the first timer) when an event corresponding to the warning or danger information occurs, and may start another timer (which may be called the second timer) when an event corresponding to the warning information disappears (Close).

The setting time of the timer may be dynamically changed according to the number of times the event occurs or stops (the number of repetitions). For example, if the number of repetitions exceeds the predetermined number (the first predetermined number), the setting time of the timer may be extended. Conversely, if the number of repetitions falls below the predetermined number (the second predetermined number), the setting time of the timer may be shortened.

In addition, when the danger information is output while the warning information is output, the warning information may be stopped. Furthermore, when an internal pressure value corresponding to the warning information or the danger information is acquired consecutively for a predetermined number of times, the alarm corresponding to the warning information or the danger information may be output regardless of whether the timer has expired. On the other hand, when a normal internal pressure value exceeding the warning threshold is obtained for a predetermined number of consecutive times, the alarm corresponding to the warning information or the danger information may be stopped regardless of whether the timer has expired.

(5) Operational Effects

According to the above-described embodiment, the following operational effects can be obtained. Specifically, the tire pressure monitoring system 10 can start a new timer when the internal pressure value exceeds the warning threshold value after falling below the warning threshold value or the danger threshold value in the period until the timer expires.

Therefore, when it is determined that the internal pressure value of the tire 30 has returned to normal, the output of the warning information or the danger information can be controlled based on the setting time of the new timer, and the warning information or the danger information can be notified at an appropriate timing and period.

In particular, even when the internal pressure value fluctuates around the threshold value which is the standard of the alarm, the occurrence and stopping of the alarm (the warning information or the danger information) frequently occurs, and the risk of the occurrence of the so-called "false positive" alarm can be reduced. As a result, the load of the tire pressure monitoring system 10 can be reduced, and the user can avoid feeling annoyance. That is, according to the tire pressure monitoring system 10, an alarm of an internal pressure drop can be outputted at an appropriate timing while preventing frequent occurrence of an alarm and a stop.

In the present embodiment, the tire pressure monitoring system 10 does not restart the timer even if the internal pressure value becomes less than the warning threshold or the danger threshold before the newly started timer expires when the warning threshold is exceeded. Therefore, the warning information or the danger information can be notified at a more appropriate timing and period.

In this embodiment, the tire pressure monitoring system 10 may continue the timer without outputting the warning information when the internal pressure value becomes higher than the danger threshold and less than the warning threshold after the internal pressure value becomes less than or equal to the danger threshold. Therefore, it is possible to avoid the output of an alarm that requires less notification, further reduce the load of the tire pressure monitoring system 10, and more reliably avoid that the user feels annoyance.

(6) Other Embodiments

Although the embodiments have been described above, they are not limited to the description of the embodiments, and it is obvious to those skilled in the art that various modifications and improvements can be made.

For example, in the above-described embodiment, the tire condition monitoring server 100 is connected to the communication network 70 and implemented by executing a computer program (software) on hardware such as a server computer, but some or all of the functions of the tire condition monitoring server 100 may be provided virtually by a combination of services provided on a network cloud (not shown).

In addition, in the above-described embodiment, the sensor unit 40 has a function of performing wireless communication with the base station 60 according to LPWA, but may further have a function of performing wireless communication with the vehicle 20 using a short-range wireless method as well as a conventional method.

Although embodiments of the present invention have been described as described above, the discussion and drawings that form part of this disclosure should not be understood as limiting the present invention. The present disclosure will reveal to those skilled in the art a variety of alternative embodiments, embodiments and operational techniques.

EXPLANATION OF REFERENCE NUMERALS 10 tire pressure monitoring system
20 vehicle
21 front wheel axles
22 rear wheel axles
30 tire
40 sensor unit
41 temperature sensor
43 pressure sensor
44 acceleration sensor
45 sensor ID setting unit
47 wireless communication unit
49 battery
60 base station
70 communication network
80 user
100 tire condition monitoring server
110 tire data acquisition unit
130 timer control unit
150 alarm unit

The invention claimed is:

1. A tire air pressure monitoring system comprising:
an acquisition unit that repeatedly acquires an internal pressure value of a pneumatic tire;
a timer control unit that activates a timer when the internal pressure value becomes equal to or less than a warning threshold; and
an alarm unit that outputs warning information until the timer expires when the internal pressure value becomes equal to or less than the warning threshold, and that outputs danger information until the timer expires when the internal pressure value becomes a danger threshold that is lower than the warning threshold, wherein
the timer control unit newly activates the timer when the internal pressure value exceeds the warning threshold value or the danger threshold value after falling below the warning threshold value or the danger threshold value in a period until the timer expires.

2. The tire air pressure monitoring system according to claim 1, wherein the timer control unit does not re-activate the timer even when the internal pressure value falls below the warning threshold value or the danger threshold value before the newly activated timer expires.

3. A tire pressure monitoring program causing a computer to execute:
an acquisition process for acquiring an internal pressure value of a pneumatic tire;
a timer control process for activating a timer when the internal pressure value becomes equal to or less than a warning threshold; and
an alarming process for outputting warning information until the timer expires when the internal pressure value falls below the warning threshold value, and outputting danger information until the timer expires when the internal pressure value becomes equal to or less than the warning threshold, and that outputs danger information until the timer expires when the internal pressure value becomes a danger threshold that is lower than the warning threshold; wherein
in the timer control process, newly activates the timer when the internal pressure value exceeds the warning threshold value or the danger threshold value after falling below the warning threshold value or the danger threshold value in a period until the timer expires.

4. A tire pressure monitoring method comprising the steps of:
an acquisition step for repeatedly acquiring the internal pressure value of a pneumatic tire;
an activating step for activating a timer when the internal pressure value becomes equal to or less than a warning threshold; and
an outputting step for outputting warning information until the timer expires when the internal pressure value becomes equal to or less than the warning threshold, and that outputs danger information until the timer expires when the internal pressure value becomes a danger threshold that is lower than the warning threshold, wherein
in the activating step, newly activates the timer when the internal pressure value exceeds the warning threshold value or the danger threshold value after falling below the warning threshold value or the danger threshold value in a period until the timer expires.

5. The tire pressure monitoring system according to claim 2, wherein
when the internal pressure value is higher than the danger threshold and falls below the warning threshold after the internal pressure value falls below the danger threshold value,
the alarm unit does not output the warning information, and
the timer control unit continues the currently running timer.

6. The tire pressure monitoring system according to claim 1, wherein
when the internal pressure value is higher than the danger threshold and falls below the warning threshold after the internal pressure value falls below the danger threshold value, the alarm unit does not output the warning information and the timer control unit continues the currently running timer.

* * * * *